United States Patent
Park

(10) Patent No.: US 8,285,042 B2
(45) Date of Patent: Oct. 9, 2012

(54) METHOD AND APPARATUS FOR DETERMINING SEXUAL CONTENT IN MOVING IMAGE CONTENT

(75) Inventor: Tae-suh Park, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 509 days.

(21) Appl. No.: 12/551,105

(22) Filed: Aug. 31, 2009

(65) Prior Publication Data

US 2010/0215268 A1  Aug. 26, 2010

(30) Foreign Application Priority Data

Feb. 20, 2009 (KR) ........................ 10-2009-0014428

(51) Int. Cl.
*G06K 9/00* (2006.01)

(52) U.S. Cl. ........................ 382/170; 382/195

(58) Field of Classification Search .................. 382/170, 382/195; 345/158; 348/E5.096; 463/29; 707/E17.028; 709/207; 714/38.1, E11.208; 715/716; 717/124, 125, 128

See application file for complete search history.

(56) References Cited

U.S. PATENT DOCUMENTS

| | | |
|---|---|---|
| 6,675,162 B1 | 1/2004 | Russell-Falla et al. |
| 6,904,168 B1 | 6/2005 | Steinberg et al. |
| 7,657,872 B2 * | 2/2010 | Kelbaugh et al. ............ 717/124 |
| 2002/0001448 A1 | 1/2002 | Jeong |
| 2003/0012399 A1 | 1/2003 | Wu |
| 2004/0208361 A1 | 10/2004 | Buzuloiu et al. |
| 2007/0239962 A1 | 10/2007 | Lee |
| 2008/0025577 A1 | 1/2008 | Kugo et al. |

FOREIGN PATENT DOCUMENTS

| | | |
|---|---|---|
| JP | 2006-254222 A | 9/2006 |
| JP | 2008-33654 A | 2/2008 |
| KR | 10-0255779 B1 | 5/2000 |
| KR | 10-0398927 B1 | 9/2003 |
| KR | 10-0517645 B1 | 9/2005 |
| KR | 10-2006-0001830 A | 1/2006 |
| KR | 10-0595032 B1 | 6/2006 |

OTHER PUBLICATIONS

Forsyth, D.A. et al. "Automatic Detection of Human Nudes", Kluwer Academic Publishers, pp. 1-16.

* cited by examiner

*Primary Examiner* — Anh Hong Do

(74) *Attorney, Agent, or Firm* — Sughrue Mion, PLLC

(57) ABSTRACT

A method and an apparatus for determining sexual content in moving image content are provided. The method includes: detecting a motion area from a plurality of moving image frames forming the moving image content; detecting skin estimation areas that are estimated to show a person's skin, based on brightness values of pixels included in each of the plurality of moving image frames; and determining whether each of the plurality of moving image frames contains sexual content, based on a ratio of the skin estimation areas to the entire motion area.

20 Claims, 4 Drawing Sheets

METHOD AND APPARATUS FOR DETERMINING SEXUAL CONTENT IN MOVING IMAGE CONTENT

CROSS-REFERENCE TO RELATED PATENT APPLICATION

This application claims priority from Korean Patent Application No. 10-2009-0014428, filed on Feb. 20, 2009, in the Korean Intellectual Property Office, the disclosure of which is incorporated herein by reference in its entirety.

BACKGROUND OF THE INVENTION

1. Field of the Invention

Methods and apparatuses consistent with the present invention relate to determining sexual content in moving image content.

2. Description of the Related Art

As use of the Internet increases and moving images are digitized, it has become a social issue that minors are exposed to moving images of a sexual nature.

Accordingly, access to websites containing sexual content is blocked by preparing a database of uniform resource locator (URL) addresses of the websites containing sexual content, or access is limited when the frequency of certain words related to sex is high, which is determined by analyzing a string included in a website that a user is attempting to access.

SUMMARY OF THE INVENTION

The present invention provides a method and an apparatus for determining sexual content in moving image content.

According to an aspect of the present invention, there is provided a method of determining sexual content in moving image content, the method includes: detecting a motion area from a plurality of moving image frames forming the moving image content; detecting skin estimation areas that are estimated to show a person's skin, based on brightness values of pixels included in each of the plurality of moving image frames; and determining whether each of the plurality of moving image frames has sexual content, based on a ratio of the skin estimation areas to the entire motion area.

The detecting the skin estimation areas may include: dividing each of the plurality of moving frames into a plurality of analysis areas; generating horizontal brightness difference values for each of the pixels included in the plurality of analysis areas by subtracting a brightness value of one pixel adjacent to a respective pixel from the pixels included in the plurality of analysis areas in a horizontal direction, from brightness value of the respective pixel; generating vertical brightness difference values for each of the pixels included in the plurality of analysis areas by subtracting a brightness value of one pixel adjacent to the respective pixel from the pixels included in the plurality of analysis areas in a vertical direction, from brightness value of the respective pixel; generating a brightness variation angle corresponding to each of the pixels, by using the horizontal brightness difference value and the vertical brightness difference value; and detecting the skin estimation areas from the plurality of analysis areas by using the brightness variation angle generated for each of the pixels.

The brightness variation angle may be generated by applying an arc tangent operation to a value obtained by dividing the vertical brightness difference value by the horizontal brightness difference value, by referring to a sign of the horizontal brightness difference value and a sign of the vertical brightness difference value.

The detecting the skin estimation areas may include: analyzing a distribution of the brightness variation values of the pixels included in each of the plurality of analysis areas, according to each of the plurality of analysis areas; and detecting the skin estimation areas based on a result of the analyzing.

The detecting the skin estimation areas based on the result of the analyzing may include detecting an analysis area, in which a deviation of the distribution of the brightness variation angles is equal to or above a first threshold value and equal to or below a second threshold value, as the skin estimation area.

The detecting the skin estimation areas based on the result of the analyzing may include: generating an angle distribution histogram for displaying a distribution form of the brightness variation angles, for each of the plurality of analysis areas; and detecting an analysis area having an angle distribution histogram that is similar to a reference histogram that is previously generated from a reference analysis area obtained from the plurality of analysis areas, wherein the reference analysis area is determined to show a person's skin and is the skin estimation area.

The detecting the skin estimation areas from the plurality of analysis areas may be performed by using a magnitude of a brightness difference value obtained by adding the square of the horizontal brightness difference value and the square of the vertical brightness difference value, and applying a root operation on the added value.

The detecting of the skin estimation areas may be also based on chromatic values of pixels included in each of the plurality of moving image frames.

The detecting the motion area may include detecting the motion area based on a difference image generated by using the plurality of moving image frames and at least one moving image frame adjacent to the plurality of moving image frames.

According to another aspect of the present invention, there is provided an apparatus for determining sexual content in moving image content, the apparatus includes: a motion area detector which detects a motion area from a plurality of moving image frames forming the moving image content; a skin estimation area detector which detects skin estimation areas that are estimated to show a person's skin, based on brightness values of pixels included in each of the plurality of moving image frames; and a sexual content determiner which determines whether each of the plurality of moving image frames has sexual content, based on a ratio of the skin estimation areas to the entire motion area.

According to another aspect of the present invention, there is provided a computer readable recording medium having recorded thereon a program for executing the method described above.

BRIEF DESCRIPTION OF THE DRAWINGS

The above and other aspects of the present invention will become more apparent by describing in detail exemplary embodiments thereof with reference to the attached drawings in which.

DETAILED DESCRIPTION OF EXEMPLARY EMBODIMENTS

Hereinafter, the exemplary embodiments will be described more fully with reference to the accompanying drawings, in which these exemplary embodiments are shown.

Figure 1:
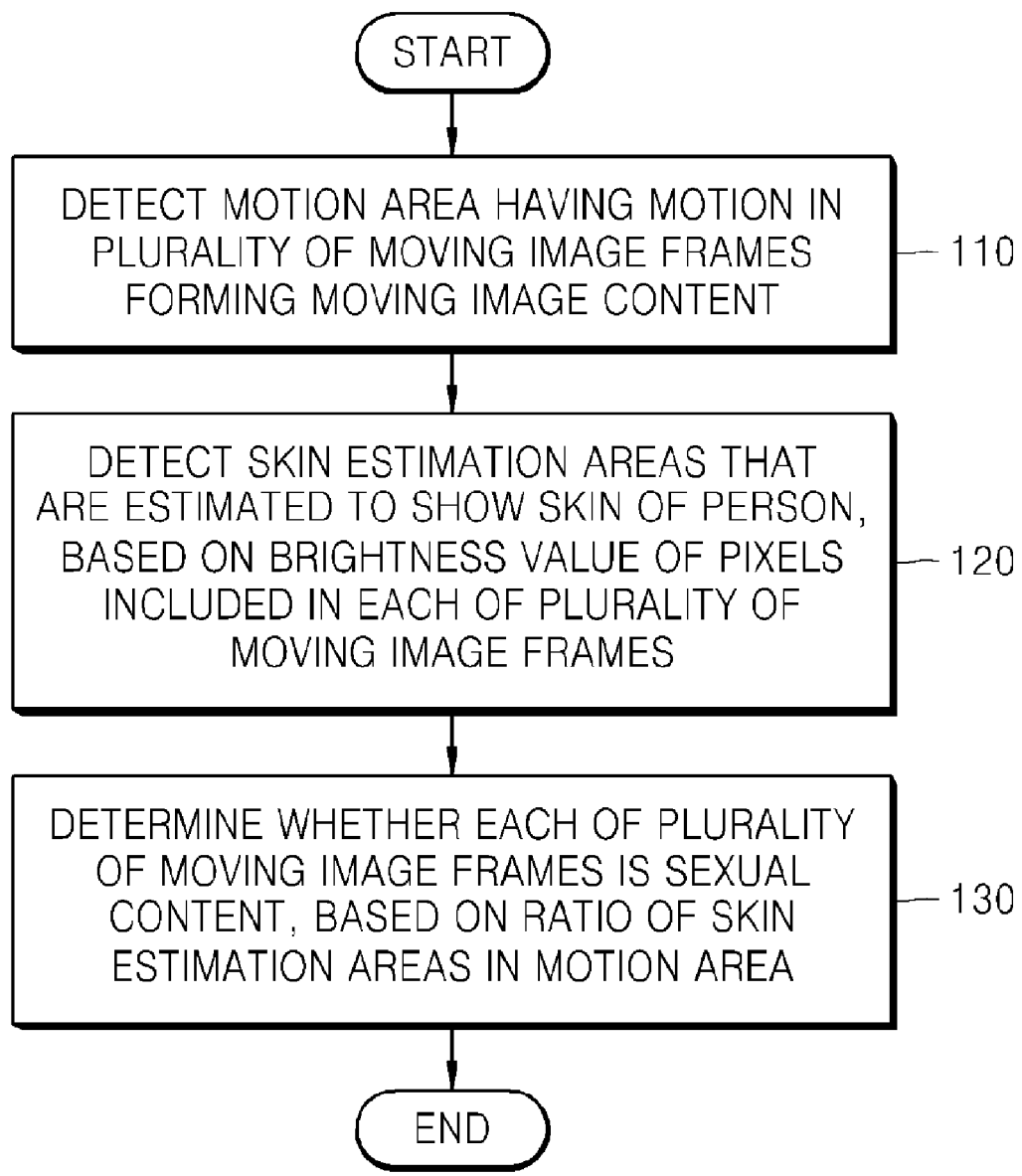
FIG. 1 is a flowchart illustrating a method of determining sexual content in moving image content, according to an exemplary embodiment of the present invention.

FIG. 1 is a flowchart illustrating a method of determining sexual content in moving image content, according to an exemplary embodiment of the present invention.

In operation 110, a motion area having motion in a plurality of moving image frames forming moving image content is detected.

Here, the motion area may be detected by using a difference image generated by using the plurality of moving image frames and at least one moving image frame adjacent to the plurality of moving image frames.

For example, when only a person is moving while background is fixed in the moving image frames, an area that includes the person may be detected as the motion area from the moving image frames.

However, a method of detecting the motion area in the moving image frames is not limited thereto, and any method of detecting a motion area may be used.

In operation 120, skin estimation areas that are areas estimated to show a person's skin are detected, based on a brightness value of pixels included in each of the moving image frames.

According to an exemplary embodiment, it is determined whether each of the plurality of moving image frames has sexual content by using a method of detecting the skin estimation areas in each of the moving image frames. In other words, exposure of the person's skin is high when a moving image frame has sexual content, and thus a moving image frame that includes many high skin estimation areas is determined to have sexual content.

Meanwhile, a method of detecting skin estimation areas, according to an exemplary embodiment of the present invention will be described later with reference to FIGS. 2 through 4.

In operation 130, it is determined whether each of the plurality of moving image frames has sexual content, based on a ratio of the skin estimation areas to the entire motion area.

As such, since the ratio of the skin estimation areas in the motion area of the moving image frame is used as opposed to the whole moving image frame, errors in determinations may be reduced compared to a conventional technology, where it is determined whether a moving image frame has sexual content by using a ratio of skin estimation areas in the entire moving image frame.

For example, in the conventional technology, a moving image frame is determined to have sexual content when a person exposing a lot of skin is displayed up close and thus a ratio of the person to the entire moving image frame is high, but is determined not to be sexual content when the person is displayed small and thus a ratio of the person to the moving image frame is low.

However, according to an exemplary embodiment of the present invention, even when a ratio of the person to the entire moving image frame is low, the moving image frame is determined to have sexual content when a ratio of a skin estimation area to the entire motion area of the moving image frame is high, and thus an error such as the one incurred in the conventional technology may be reduced.

An exemplary embodiment of the present invention assumes that only a person moves and that background does not move in general sexual content.

Figure 2:
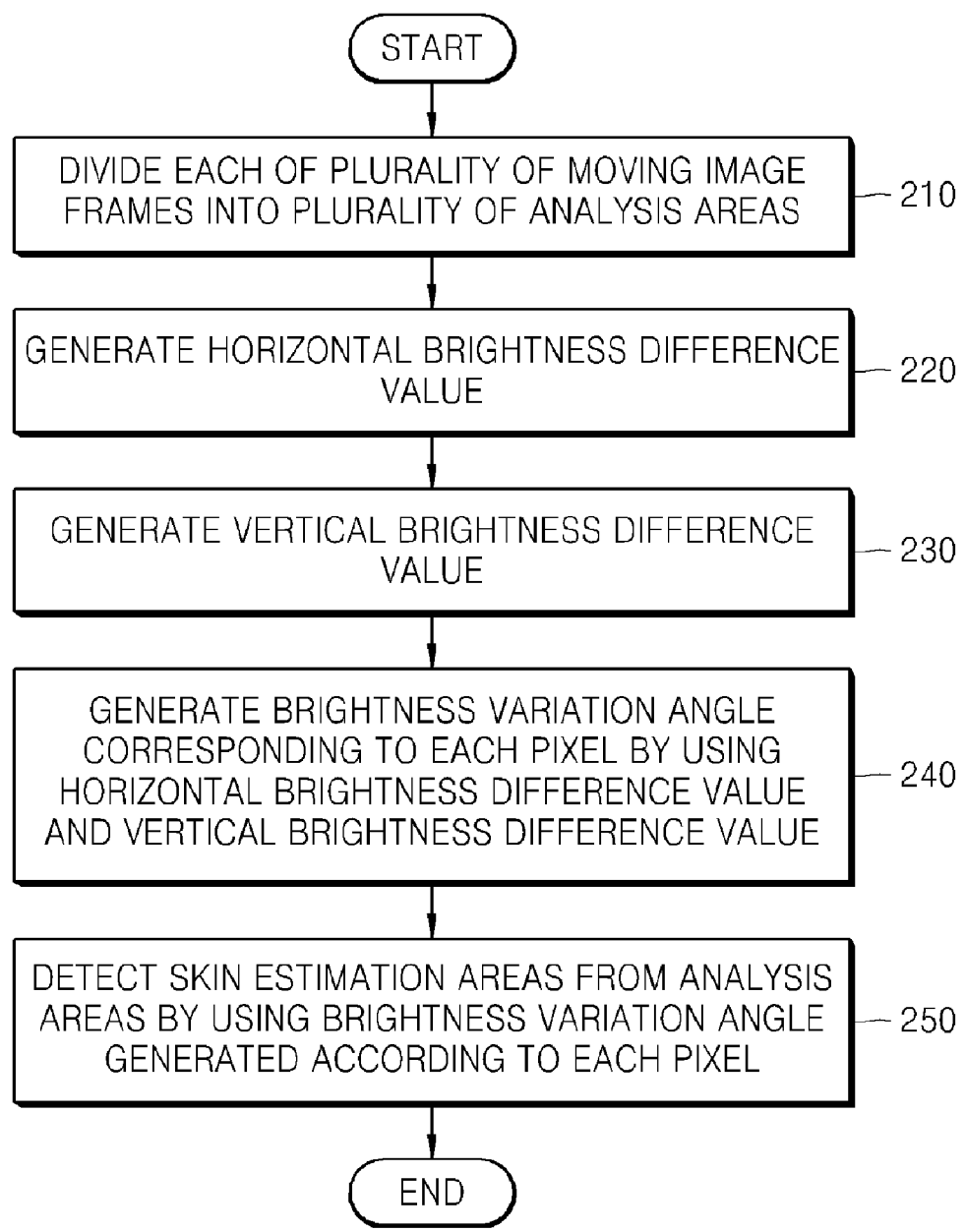
FIG. 2 is a flowchart illustrating a method of detecting skin estimation areas by using a brightness value of pixels, according to an exemplary embodiment of the present invention.

FIG. 2 is a flowchart illustrating a method of detecting skin estimation areas by using brightness values of pixels, according to an exemplary embodiment of the present invention.

In operation 210, each of a plurality of moving image frames is divided into a plurality of analysis areas.

For example, an analysis area may include pixels of a 20×20 matrix, or pixels of a 30×30 matrix. The size of the analysis area may be arbitrarily set by a user, and the analysis area may include pixels having different vertical and horizontal numbers from the ones described above.

In operation 220, for each pixel in the analysis area, its horizontal brightness difference value is generated by subtracting the brightness value of the pixel from the brightness value of its horizontally adjacent pixel.

For example, the horizontal brightness difference value may be calculated as given by Equation 1 below.

$$dx = I(x,y) - I(x+1,y) \quad (1)$$

In other words, a horizontal brightness difference value dx may be calculated by subtracting a brightness value I of a pixel located at an (x+1, y) coordinate adjacent to the right of a pixel located at an (x, y) coordinate, from a brightness value of the pixel located at an (x, y) coordinate.

For example, when a brightness value may have a value in a range from 0 to 10, i.e. from a darkest value to a brightest value, and a brightness value of an (x, y) pixel is 5 and a brightness value of a (x+1, y) pixel is 10, a horizontal brightness difference value dx in the (x, y) pixel is −5. When the horizontal brightness difference value dx in the (x, y) pixel is indicated as a vector, the vector may have a magnitude of 5 in a left direction. The brightness difference dx is calculated for each pixel in the analysis area.

According to another exemplary embodiment of the present invention, the horizontal brightness difference value dx may be calculated by subtracting a brightness value of a (x−1, y) pixel adjacent to the left of the (x, y) pixel, from the brightness value of the (x, y) pixel.

In operation 230, for each pixel in the analysis area, its vertical brightness difference value is generated by subtracting the brightness value of the pixel from the brightness value of its vertically adjacent pixel.

For example, the vertical brightness difference value may be calculated as given by Equation 2 below.

$$dy = I(x,y) - I(x,y+1) \quad (2)$$

In other words, a vertical brightness difference value dy may be calculated by subtracting a brightness value of an (x, y+1) pixel above an (x, y) pixel, from a brightness value of the (x, y) pixel.

For example, when a brightness value may have a value in a range from 0 to 10, i.e. from a darkest value to a brightest value, and a brightness value of a (x, y) pixel is 5 and a brightness value of a (x, y+1) pixel is 0, a vertical brightness difference value dy in the (x, y) pixel is 5. When the vertical brightness difference value dy in the (x, y) pixel is indicated as a vector, the vector may have a magnitude of 5 in an upward direction.

According to another exemplary embodiment of the present invention, the vertical brightness difference value dy may be calculated by subtracting a brightness value of an (x, y−1) pixel below an (x, y) pixel, from the brightness value of the (x, y) pixel.

In operation 240, a brightness variation angle corresponding to each of the pixels is generated by using the horizontal brightness difference value and the vertical brightness difference value.

Here, the brightness variation angle may be calculated as given by an Equation 3 below.

$$ang(x, y) = \tan^{-1}\left(\frac{dy}{dx}\right) \quad (3)$$

In other words, a brightness variation angle ang(x, y) may be generated by applying an arc tangent operation to a value obtained by dividing the vertical brightness difference value by the horizontal brightness difference value. Here, the brightness variation angle ang(x, y) may be determined by referring to a sign of the horizontal brightness difference value and a sign of the vertical brightness difference value.

For example, when the horizontal brightness difference value dx is −5 and the vertical brightness difference value dy is 5 in the (x, y) pixel, the brightness variation angle ang(x, y) in the (x, y) pixel is 135°.

Here, the brightness variation angle ang(x, y) may be calculated by using another equation other than Equation 3 above.

In operation 250, skin estimation areas are detected in the analysis areas, by using the brightness variation angle generated according to each of the pixels.

Here, an exemplary method of detecting skin estimation areas by using a brightness variation angle will be described later with reference to FIG. 3.

Meanwhile, the magnitude of a brightness difference value may also be used along with the brightness variation angle for detecting the skin estimation areas.

Here, the magnitude of the brightness difference value may be calculated as given by Equation 4 below.

$$mag(x,y)=\sqrt{dx^2+dy^2} \quad (4)$$

In other words, a magnitude mag(x, y) of a brightness difference value may be generated by applying a root operation on a value obtained by adding the square of the horizontal brightness difference value dx and the square of the vertical brightness difference value dy.

Once the brightness difference values in the pixels included in each of the analysis areas is calculated as given by Equation 4, an analysis area including pixels having a magnitude of the brightness difference value smaller than a threshold value, where the number of the pixels is equal to or above a predetermined number, may be detected as a skin estimation area.

In a moving image frame, a person's skin tends to have a lower texture than background or other objects, and especially in case of commercial adult content, this tendency is strengthen because human skin is occasionally softened via retouching or full body cosmetics in order to maximize sex appeal, and thereby such a low texture is used as a good feature to detect a skin estimation area.

In other words, the analysis area including the pixels having the magnitude of the brightness difference value smaller than the threshold value, where the number of the pixels is equal to or above a predetermined number, is detected as a skin estimation area, since the analysis area is regarded as having a low texture.

Meanwhile, a chromatic value of the pixels included in each of the moving image frames may be used to detect a skin estimation area.

For example, an analysis area including pixels having a chromatic value similar to a chromatic value of a person's skin, where the number of the pixels is equal to or above a predetermined number, may be detected as a skin estimation area.

Figure 3:
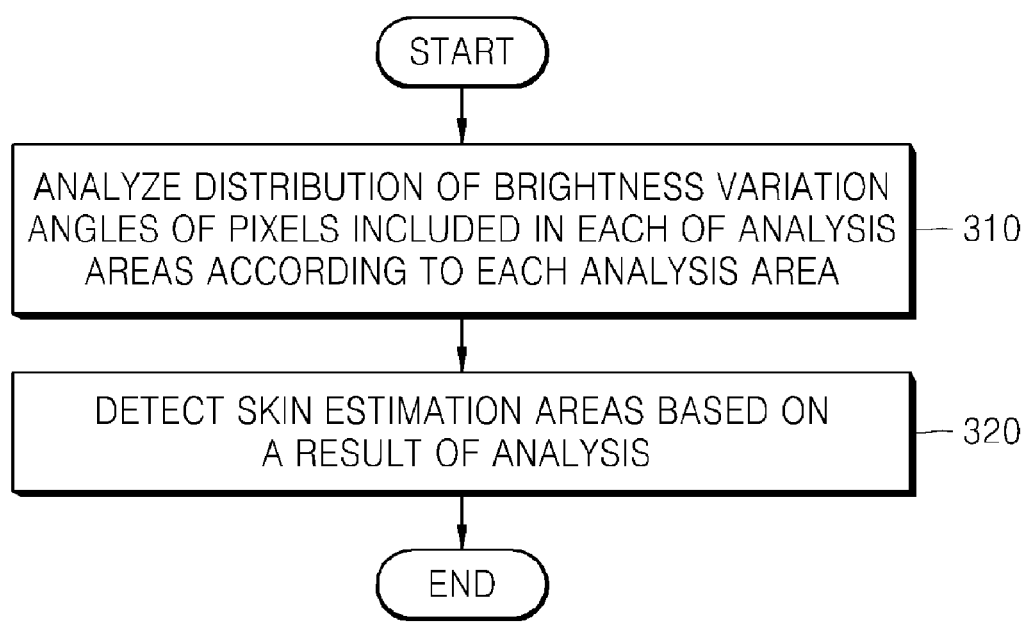
FIG. 3 is a flowchart illustrating a method of detecting skin estimation areas by using a brightness variation angle of pixels, according to an exemplary embodiment of the present invention.

FIG. 3 is a flowchart illustrating a method of detecting skin estimation areas by using a brightness variation angle of pixels, according to an exemplary embodiment of the present invention.

In operation 310, a distribution of brightness variation angles of pixels included in each of a plurality of analysis areas is analyzed according to each analysis area.

For example, when each of the analysis areas includes pixels of a 3×3 matrix, distribution of brightness variation angles in pixels included in any one of the analysis areas may be 3 of 135°, 2 of 120°, 2 of 45°, 1 of 15°, and 1 of 0°.

In operation 320, skin estimation areas are detected based on a result of operation 310.

For example, an analysis area having a deviation of the distribution of the brightness variation angles equal to or above a first threshold value and equal to or below a second threshold value may be detected as a skin estimation area. Here, the first and second threshold values may be determined to be relatively small values.

In moving image frames, the deviation of distribution of brightness variation angles in pixels included in an area showing a person's skin tends to be small compared to the deviation of distribution of brightness variation angles in pixels included in an area showing background or another object, and such a characteristic is used to detect skin estimation areas.

Meanwhile, according to another exemplary embodiment of the present invention, skin estimation areas may be detected by using a distribution form of brightness variation angles in pixels included in an analysis area.

Figure 4A:
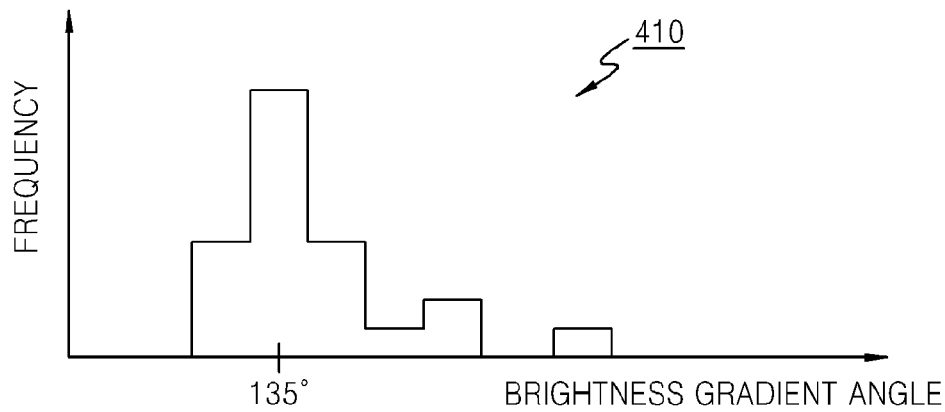
FIGS. 4A and 4B are diagrams for describing a method of detecting skin estimation areas by using a brightness variation angle of pixels, according to an exemplary embodiment of the present invention.
Figure 4B:
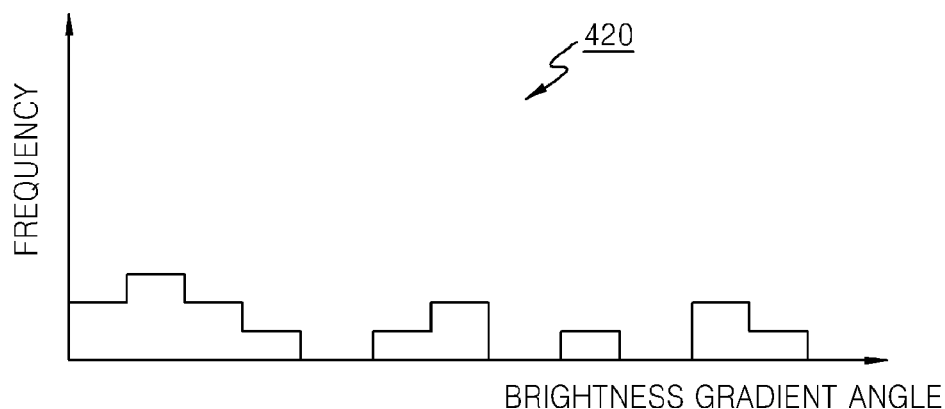

FIGS. 4A and 4B are diagrams for describing a method of detecting skin estimation areas by using a brightness variation angle of pixels, according to an exemplary embodiment of the present invention.

FIG. 4 (a) illustrates an angle distribution histogram 410 corresponding to the skin of an arm of a person in a moving image frame, and FIG. 4 (b) illustrates an angle distribution histogram 420 corresponding to background in the moving image frame.

As shown in FIGS. 4A and 4B, the angle distribution histogram 410 has a small deviation around 135°, but the angle distribution histogram 420 has a large deviation since brightness variation angles are scattered.

Meanwhile, as shown in FIGS. 4A and 4B, the angle distribution histogram 410 has a unique distribution form, and an angle distribution histogram corresponding to an arm and an angle distribution histogram corresponding to a leg have similar distribution forms. Also, although not illustrated in FIGS. 4A and 4B, an angle distribution histogram corresponding to a body of a person has a unique distribution form.

Each of the angle distribution histograms corresponding to the arm, the leg, and the body of a person has a unique distribution form since the arm, the leg, and the body have a curved form whereas background has an even form.

In other words, when light is cast on a person, a bright portion and a dark portion are generated along a unique curve of an arm, a leg, and a body of the person. Here, brightness variation angles are formed from the bright portion to the dark portion according to each pixel included in a moving image frame, and a unique distribution form of the brightness variation angles is generated in an analysis area formed of pixels.

Accordingly, a distribution histogram corresponding to an analysis area determined to show the skin of an arm, a leg, and a body of a person is prepared in a database as a reference histogram, and then it is determined whether an analysis area is a skin estimation area by comparing an angle distribution histogram of the analysis area and the reference histogram.

For example, the angle distribution histogram 410 of FIG. 4A is stored as a reference histogram corresponding to an arm of a person, and then a predetermined analysis area is determined to be a skin estimation area when an angle distribution histogram of the predetermined analysis area has a similar distribution form as the angle distribution histogram 410 by comparing the angle distribution histogram of the predetermined analysis area with the reference histogram.

In the above example, a method of detecting a skin estimation area uses the similarity between a reference histogram and an angle distribution histogram, but the method is not limited thereto, and any method of detecting a skin estimation area by using a reference histogram and an angle distribution histogram may be used.

Figure 5:
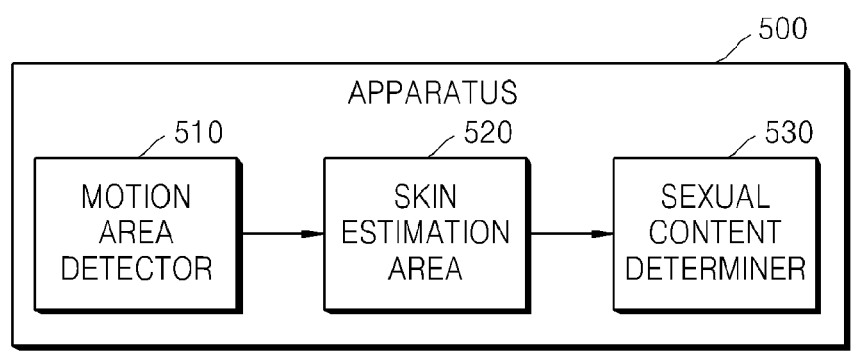
FIG. 5 is a block diagram of an apparatus for determining sexual content in moving image content, according to an exemplary embodiment of the present invention.

FIG. 5 is a block diagram of an apparatus 500 for determining sexual content in moving image content, according to an exemplary embodiment of the present invention.

Referring to FIG. 5, the apparatus 500 according to an exemplary embodiment of the present invention includes a motion area detector 510, a skin estimation area detector 520, and a sexual content determiner 530.

The motion area detector 510 detects a motion area having motion in a plurality of moving image frames forming moving image content.

The skin estimation area detector 520 detects skin estimation areas that are estimated to show a person's skin, based on a brightness value of pixels included in each of the plurality of moving image frames.

According to another exemplary embodiment, the skin estimation area detector 520 may detect skin estimation areas by only using pixels included in the motion area.

For example, the skin estimation area detector 520 may detect the skin estimation areas included in the motion area based on the brightness value of the pixels included in the motion area.

The sexual content determiner 530 determines whether each of the plurality of moving image frames is sexual content based on a ratio of the skin estimation areas to the entire motion area.

Here, the apparatus 500 is installed in a display device for reproducing moving image content. Accordingly, a user does not have to install a separate apparatus in the display device, as sexual content output from the display device is fundamentally blocked by the apparatus installed therein.

For example, when the display device installed in the apparatus 500 according to an exemplary embodiment begins to reproduce moving image content and moving image frames that are determined to be sexual content, the display device blocks reproduction of the sexual content by pixelating the moving image frames that are determined to be sexual content or by covering the moving image frames with other images.

Meanwhile, the apparatus 500 installed in the display device may be implemented in software or hardware such as a computer and/or a processor, and the apparatus may be configured in such a way that access by a user or a third person is blocked in order to prevent hacking.

The exemplary embodiments of the present invention can be written as computer programs and can be implemented in general-use digital computers that execute the programs using a computer readable recording medium. Examples of the computer readable recording medium include magnetic storage media (e.g., ROM, floppy disks, hard disks, etc.), optical recording media (e.g., CD-ROMs, or DVDs). As an alternative to the computer readable recording medium, the program can be stored on a storage media such as carrier waves (e.g., transmission through the Internet).

While this invention has been particularly shown and described with reference to preferred embodiments thereof, it will be understood by those of ordinary skill in the art that various changes in form and details may be made therein without departing from the spirit and scope of the invention as defined by the appended claims. The exemplary embodiments should be considered in a descriptive sense only and not for purposes of limitation. Therefore, the scope of the invention is defined not by the detailed description of the exemplary embodiments but by the appended claims, and all differences within the scope will be construed as being included in the present invention.

What is claimed is:

1. A method of determining sexual content in moving image content, the method comprising:
   detecting a motion area from a plurality of moving image frames forming the moving image content;
   detecting skin estimation areas that are estimated to show skin of a person, based on brightness values of pixels included in each of the plurality of moving image frames; and
   determining, by a hardware processor, whether each of the plurality of moving image frames has sexual content, based on a ratio of the skin estimation areas to an entire motion area.

2. The method of claim 1, wherein the detecting the skin estimation areas comprises:
   dividing each of the plurality of moving frames into a plurality of analysis areas;
   generating horizontal brightness difference values for each of the pixels included in the plurality of analysis areas by subtracting a brightness value of one pixel adjacent to a respective pixel from the pixels included in the plurality of analysis areas in a horizontal direction, from brightness value of the respective pixel;
   generating vertical brightness difference values for each of the pixels included in the plurality of analysis areas by subtracting a brightness value of one pixel adjacent to the respective pixel from the pixels included in the plurality of analysis areas in a vertical direction, from brightness value of the respective pixel;
   generating a brightness variation angle corresponding to each of the pixels, based on the horizontal brightness difference value and the vertical brightness difference value; and
   detecting the skin estimation areas from the plurality of analysis areas based on the brightness variation angle generated for each of the pixels.

3. The method of claim 2, wherein the brightness variation angle is generated by applying an arc tangent operation to a value obtained by dividing the vertical brightness difference value by the horizontal brightness difference value, based on a sign of the horizontal brightness difference value and a sign of the vertical brightness difference value.

4. The method of claim 2, wherein the detecting the skin estimation areas comprises:
analyzing a distribution of the brightness variation values of the pixels included in each of the plurality of analysis areas, according to each of the plurality of analysis areas; and detecting the skin estimation areas based on a result of the analyzing.

5. The method of claim 4, wherein the detecting the skin estimation areas based on the result of the analyzing comprises detecting an analysis area, in which a deviation of the distribution of the brightness variation angles is equal to or greater than a first threshold value and equal to or less than a second threshold value, as the skin estimation area.

6. The method of claim 4, wherein the detecting the skin estimation areas based on the result of the analyzing comprises:
generating an angle distribution histogram for displaying a distribution form of the brightness variation angles, for each of the plurality of analysis areas; and
detecting an analysis area having an angle distribution histogram that is similar to a reference histogram that is previously generated from a reference analysis area obtained from the plurality of analysis areas, wherein the reference analysis area is determined to show a skin of a person and is the skin estimation area.

7. The method of claim 2, wherein the detecting the skin estimation areas from the plurality of analysis areas is performed by using a magnitude of a brightness difference value obtained by adding a square of the horizontal brightness difference value and a square of the vertical brightness difference value, and applying a root operation on an added value.

8. The method of claim 1, wherein the detecting the skin estimation areas is performed based on chromatic values of pixels included in each of the plurality of moving image frames.

9. The method of claim 1, wherein the detecting the motion area comprises detecting the motion area based on a difference image generated by using the plurality of moving image frames and at least one moving image frame adjacent to the plurality of moving image frames.

10. A non-transitory computer readable recording medium having recorded thereon a program for executing the method of claim 1.

11. An apparatus for determining sexual content in moving image content, the apparatus comprising:
a motion area detector which detects a motion area from a plurality of moving image frames forming the moving image content;
a skin estimation area detector which detects skin estimation areas that are estimated to show skin of a person, based on brightness values of pixels included in each of the plurality of moving image frames; and
a sexual content determiner which determines whether each of the plurality of moving image frames has sexual content, based on a ratio of the skin estimation areas to an entire motion area.

12. The apparatus of claim 11, wherein the skin estimation area detector divides each of the plurality of moving frames into a plurality of analysis areas, generates horizontal brightness difference values for each pixel in the plurality of analysis areas by subtracting a brightness value of one pixel adjacent to a respective pixel from pixels included in the plurality of analysis areas in a horizontal direction, from a brightness value of the respective pixel, generates vertical brightness difference values for each pixel in the plurality of analysis areas by subtracting a brightness value of one pixel adjacent to the respective pixel from the pixels included in the plurality of analysis areas in a vertical direction, from brightness value of the respective pixel, generates the brightness variation angles for the pixels, based on the horizontal brightness difference values and the vertical brightness difference values, and detects the skin estimation areas from the plurality of analysis areas based on the brightness variation angles generated for the pixels.

13. The apparatus of claim 12, wherein the skin estimation area detector generates each of the brightness variation angles by applying an arc tangent operation to a value obtained by dividing respective vertical brightness difference value by respective horizontal brightness difference value, based on a sign of the respective horizontal brightness difference value and a sign of the respective vertical brightness difference value.

14. The apparatus of claim 12, wherein the skin estimation area detector analyzes a distribution of the brightness variation values of the pixels included in each of the plurality of analysis areas, according to each of the plurality of analysis areas, and detects the skin estimation areas based on a result of the analyzing.

15. The apparatus of claim 14, wherein the skin estimation area detector detects an analysis area, in which a deviation of the distribution of the brightness variation angles is equal to or greater than a first threshold value and equal to or less than a second threshold value, based on analyzing each of the plurality of analysis areas and determines that the analysis area is the skin estimation area.

16. The apparatus of claim 14, wherein the skin estimation area detector generates an angle distribution histogram for displaying a distribution form of the brightness variation angles, according to each of the plurality of analysis areas, and detects an analysis area having an angle distribution histogram that is similar to a reference histogram that is previously generated from a reference analysis area from the plurality of analysis areas, where the reference analysis area is determined to show the skin of the person and is the skin estimation area.

17. The apparatus of claim 12, wherein the skin estimation area detector detects the skin estimation area by using a magnitude of a brightness difference value obtained by adding a square of a horizontal brightness difference value and a square of the vertical brightness difference value, and applying a root operation to an added value.

18. The apparatus of claim 11, wherein the skin estimation area detector detects the skin estimation area based on chromatic values of pixels included in each of the plurality of moving image frames.

19. The apparatus of claim 11, wherein the motion area detector detects the motion area based on a difference image generated by using the plurality of moving image frames and at least one moving image frame adjacent to the plurality of moving image frames.

20. The apparatus of claim 11, wherein the apparatus is installed in a display device which reproduces the moving image content.

* * * * *